US 9,705,911 B2

(12) United States Patent
Li et al.

(10) Patent No.: US 9,705,911 B2
(45) Date of Patent: Jul. 11, 2017

(54) SYSTEM AND METHOD FOR USING QUARANTINE NETWORKS TO PROTECT CELLULAR NETWORKS FROM VIRUSES AND WORMS

(75) Inventors: Changhong Li, Espoo (FI); Zoltan Olah, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1818 days.

(21) Appl. No.: 11/173,861

(22) Filed: Jun. 30, 2005

(65) Prior Publication Data

US 2007/0006312 A1 Jan. 4, 2007

(51) Int. Cl.
G06F 12/14 (2006.01)
G06F 11/00 (2006.01)
H04L 9/32 (2006.01)
G06F 11/30 (2006.01)
G06F 12/16 (2006.01)
G06F 15/18 (2006.01)
G08B 23/00 (2006.01)
H04L 29/06 (2006.01)

(52) U.S. Cl.
CPC .. H04L 63/1441 (2013.01); G06F 2221/2149 (2013.01)

(58) Field of Classification Search
CPC ..................... H04L 63/1441; G06F 2221/2149
USPC ...................................................... 726/22–25
See application file for complete search history.

(56) References Cited

U.S. PATENT DOCUMENTS 6,700,891 B1 * 3/2004 Wong ............................. 370/401
6,792,543 B2 * 9/2004 Pak et al. ......................... 726/24
7,096,368 B2 * 8/2006 Kouznetsov et al. ........... 726/24
7,096,501 B2 * 8/2006 Kouznetsov et al. ........... 726/24
7,124,197 B2 * 10/2006 Ocepek et al. ................ 709/232
7,171,690 B2 * 1/2007 Kouznetsov et al. ........... 726/22
7,263,609 B1 * 8/2007 Wante et al. .................. 713/160
7,299,361 B1 * 11/2007 Kim et al. ...................... 713/188
7,386,888 B2 * 6/2008 Liang et al. ..................... 726/23
7,533,407 B2 * 5/2009 Lewis et al. ...................... 726/6
7,571,460 B2 * 8/2009 Danforth et al. ................. 726/1

(Continued)

FOREIGN PATENT DOCUMENTS

GB          2357939 A         7/2001
WO       2004/092872 A2    10/2004
WO       WO2006/034201      3/2006

OTHER PUBLICATIONS

"Know Your Enemy: Honeywell CDROM" Published by the Honeynet Project on May 7, 2004 http://web.archive.org/web/20041010034241/honeynet.org/papers/cdrom/index.html.*

(Continued)

*Primary Examiner* — Joseph P Hirl
*Assistant Examiner* — Thomas Gyorfi
(74) *Attorney, Agent, or Firm* — Banner & Witcoff, Ltd.

(57) ABSTRACT

A system and method for providing a quarantine network to address threats emanating from viruses and worms. A quarantine network quarantines an infected terminal's traffic from the normal traffic flow. During the quarantine period, all of the traffic is analyzed by a quarantine network component. Based upon the results of this analysis, the network can restrict the access of infected terminals to various services, as well as prevent other devices from becoming infected by blocking infected materials such as attachments from reaching their respective recipients.

22 Claims, 5 Drawing Sheets

(56) References Cited

U.S. PATENT DOCUMENTS

| | | | |
|---|---|---|---|
| 7,630,381 B1* | 12/2009 | Roskind et al. | 370/395.42 |
| 2002/0116639 A1 | 8/2002 | Chefalas et al. | |
| 2002/0199116 A1 | 12/2002 | Hoene et al. | |
| 2003/0126468 A1* | 7/2003 | Markham | 713/201 |
| 2003/0172301 A1* | 9/2003 | Judge et al. | 713/201 |
| 2003/0233566 A1* | 12/2003 | Kouznetsov et al. | 713/200 |
| 2004/0003276 A1* | 1/2004 | Kouznetsov et al. | 713/200 |
| 2004/0010703 A1* | 1/2004 | Kouznetsov et al. | 713/200 |
| 2004/0025042 A1* | 2/2004 | Kouznetsov et al. | 713/200 |
| 2004/0103310 A1 | 5/2004 | Sobel et al. | |
| 2004/0111632 A1* | 6/2004 | Halperin | 713/200 |
| 2005/0131997 A1 | 6/2005 | Lewis et al. | |
| 2005/0198519 A1* | 9/2005 | Tamura et al. | 713/188 |
| 2005/0216957 A1* | 9/2005 | Banzhof et al. | 726/25 |
| 2005/0229255 A1 | 10/2005 | Gula et al. | |
| 2005/0273853 A1 | 12/2005 | Oba et al. | |
| 2006/0031921 A1* | 2/2006 | Danforth et al. | 726/1 |

OTHER PUBLICATIONS

Know Your Enemy: GenII Honeynets Published by the Honeynet Project on Nov. 3, 2003. http://web.archive.org/web/20050206221751/www.honeynet.org/papers/gen2/.*
U.S. Appl. No. 60/573,702, filed May 24, 2004 (75 pages).*
S. Kondo et al. "Qurantine Model Overview for IPv6 Network Security" Published Feb. 8, 2004 (24 pages) http://ietfreport.isoc.org/ids/draft-kondo-quarantine-overview-00.txt.*
"Zone Labs Integrity Clientless Security Product Sheet" received by the USPTO on May 24, 2004 (4 pages).*
"StillSecure: Safe Access Overview" received by the USPTO on May 24, 2004 (2 pages) http://www.stillsecure.com/products/sa.*
U.S. Appl. No. 60/613,909 [Roskind et al.] filed Sep. 24, 2004 (57 pages).*
StillSecure™: Overview. © 2002-2004 Latis Networks. Published Oct. 20, 2004 as verified by the Internet Archive http://web.archive.org/web/20041020030003/www.stillsecure.com/products/sa/index.php.*
StillSecure™: The Safe Access™ Process. © 2002-2004 Latis Networks. Published May 25, 2004 as verified by the Internet Archive. http://web.archive.org/web/20040525173937/www.stillsecure.com/products/sa/process.php.*
StillSecure™ Safe Access™ datasheet. © 2002-2004 Latis Networks. Published May 5, 2004 as verified by the Internet Archive. http://web.archive.org/web/20040505162316/www.stillsecure.com/docs/StillSecure_SA_datasheet.pdf.*
"Implementing Network Admission Control Phase One Configuration and Deployment" © 2004 Cisco Systems. Published Aug. 9, 2004 as verified by the Internet Archive. (88 pages) http://web.archive.org/web/20040809000958/cisco.com/application/pdf/en/us/guest/netsol/ns466/c654/cdccont_0900aecd800fdd7b.pdf.*
"Cisco Security Vision and Network Admission Control" © 2004 Cisco Systems Inc. Published Jun. 2004 (16 pages) http://web.archive.org/web/20050531124722/www.cisco.com/application/pdf/en/us/guest/netsol/ns466/c664/cdccont_0900aecd800ce939.pdf.*
"Network Admission Control At-a-Glance" © 2004 Cisco Systems Inc. Published Jun. 23, 2004 as verified by the Internet Archive http://web.archive.org/web/20040623205457/www.cisco.com/application/pdf/en/us/guest/netsol/ns466/c643/cdccont_0900aecd800fdd58.pdf.*
Cisco Systems: Network Admission Control web page © 2004 Cisco Inc. Published Nov. 4, 2004 as verified by the Internet Archive http://web.archive.org/web/20041104033800/www.cisco.com/en/US/netsol/ns466/networking_solutions_sub_solution_home.html.*
"StillSecure™: The Safe Access™ process" Article dated May 24, 2004 as verified by the Internet Archive (3 pages) http://web.archive.org/web/20040525173937/http://www.stillsecure.com/products/sa/process.php.*
"StillSecure™: Overview" Article dated Jun. 4, 2004 as verified by the Internet Archive (2 pages) http://web.archive.org/web/20040604112910/http://stillsecure.com/products/sa/index.php.*
"StillSecure™: Deployment flexibility" Article dated Jun. 4, 2004 as verified by the Internet Archive (2 pages) http://web.archive.org/web/20040604112701/http://stillsecure.com/products/sa/deployment.php.*
"StillSecure™: Out-of-the-box tests" Article dated Jun. 4, 2004 as verified by the Internet Archive (3 pages) http://web.archive.org/web/20040604115838/http://stillsecure.com/products/sa/tests.php.*
"StillSecure™: Differentiators/advantages" Article dated Jun. 4, 2004 as verified by the Internet Archive (2 pages) http://web.archive.org/web/20040604151159/http://stillsecure.com/products/sa/advantages.php.*
"StillSecure™: How to buy" Article dated Jun. 4, 2004 as verified by the Internet Archive (2 pages) http://web.archive.org/web/20040604152019/http://stillsecure.com/products/sa/buy.php.*
"StillSecure™: System requirements" Article dated Jun. 4, 2004 as verified by the Internet Archive (2 pages) http://web.archive.org/web/20040604115018/http://stillsecure.com/products/sa/requirements.php.*
Toedtmann et al., The Honeynet quarantine: reducing collateral damage caused by early intrusion response. Systems, Man and Cybernetics (SMC) Information Assurance Workshop 2005, Proceedings from the Sixth Annual IEEE, Publication Jun. 15-17, 2005, p. 464-465.
International Search Report for Application PCT/IB2006/001780.
Birger Toedtmann et al., "The Honeynet Quarantine: Reducing Collateral Damage Caused by Early Intrusion Response", Proceedings of the 2005 IEEE Workshop on Information Assurance and Security United States Military Academy, West Point, NY, pp. 464-465.
European Application No. 06 765 605.8—Office Action dated Oct. 9, 2012.
Aaron M. Soto, Implementation of Virtual LANs for Virus Containment, prepared for Dr. Peter Anselmo, Information Technology Department, New Mexico Tech, Socorro, NM, Dec. 9, 2004.
John Levine et al, The Use of Honeynets to Detect Exploited Systems Across Large Enterprise Networks, Proceedings of the 2003 IEEE Workshop on Information Assurance, United States Military Academy, West Point, NY Jun. 2003.
European Application No. 06 765 605.8-2413—Office Action dated Nov. 8, 2011.
European Application No. 06 765 605.8—Office Action dated Oct. 14, 2013.
Mar. 15, 2011 (EP) Supplemental Search Report—App. No. 06765605.8.
Riebach. Stephan, et al, "Combining IDS and Honeynet Methods for Improved Detection and Automatic Isolation of Compromised Systems," University Duisberg-Essen, Germany, Jul. 7, 2005, pp. 1-15.
European Office action dated Jul. 17, 2014—App. No. 06765605.8.
European Office Action dated Jan. 5, 2015 in Application No. 06765605.8.
Sep. 10, 2015 (EP) Office Action—App 06765605.8.
Jun. 21, 2016 (EP) Office Action—App. 06765605.8.

* cited by examiner

US 9,705,911 B2

SYSTEM AND METHOD FOR USING QUARANTINE NETWORKS TO PROTECT CELLULAR NETWORKS FROM VIRUSES AND WORMS

FIELD OF THE INVENTION

The present invention relates generally to cellular networks. More particularly, the present invention relates to the prevention of viruses and worms from entering and propagating through cellular networks.

BACKGROUND OF THE INVENTION

Mobile devices such as mobile telephones and personal digital assistants (PDAs) can become infected by computer viruses and worms through several mechanisms. A computer virus is a parasitic program that is designed to enter a computer or other electronic device without the user's permission or knowledge. The virus attaches to files or boot sectors and replicates itself, thus continuing to spread. A computer worm also copies itself across a network but, unlike a computer virus, is capable of spreading without a host program.

In recent years, virus and worm attacks have proliferated on the Internet. Attacks using malicious objects such as viruses and worms not only perform malicious actions, such as using up a terminal's resources, modifying the configuration of the terminal, preventing applications from running, or shutting down the system, but these programs can often infect other terminals at an extraordinary rate.

In a short period of time, these viruses and worms can quickly spread, affecting a considerable number of users and affecting the network resources because of the traffic that is generated.

When it comes to viruses and worms propagating through cellular networks, it is understood that prevention is the best approach to addressing this issue. Protecting the network infrastructure may not be enough to completely protect a network, but it is often desirable or necessary to implement at least some procedures for detecting infected terminals, as well as repairing and cleaning infected terminals.

A number of entities are continuously attempting to solve the problems associated with the infection and propagation of viruses and worms within cellular networks. However, conventional systems are currently only capable of preventing and addressing some of the problems associated with worms and viruses.

SUMMARY OF THE INVENTION

To address the problem of viruses and worms propagating through a cellular network, the present invention provides for an antivirus architecture with a quarantine network. If a terminal within the network is suspected of being infected by a virus or worm, the terminal is placed within the quarantine network. Traffic to and from terminals in the quarantine network is separated from normal traffic. During the quarantine process, the traffic is analyzed by a quarantine network component. Based upon the result of this analysis, the quarantine component selectively allows the access of infected terminals to the network and network services. The quarantine network can also provide 'special treatment' to such terminals through the existing network.

With the present invention, the quarantine network has the ability to quarantine the infected terminal without completely shutting it out from the access network. The present invention can also result in more support being provided for repairing infected terminals.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
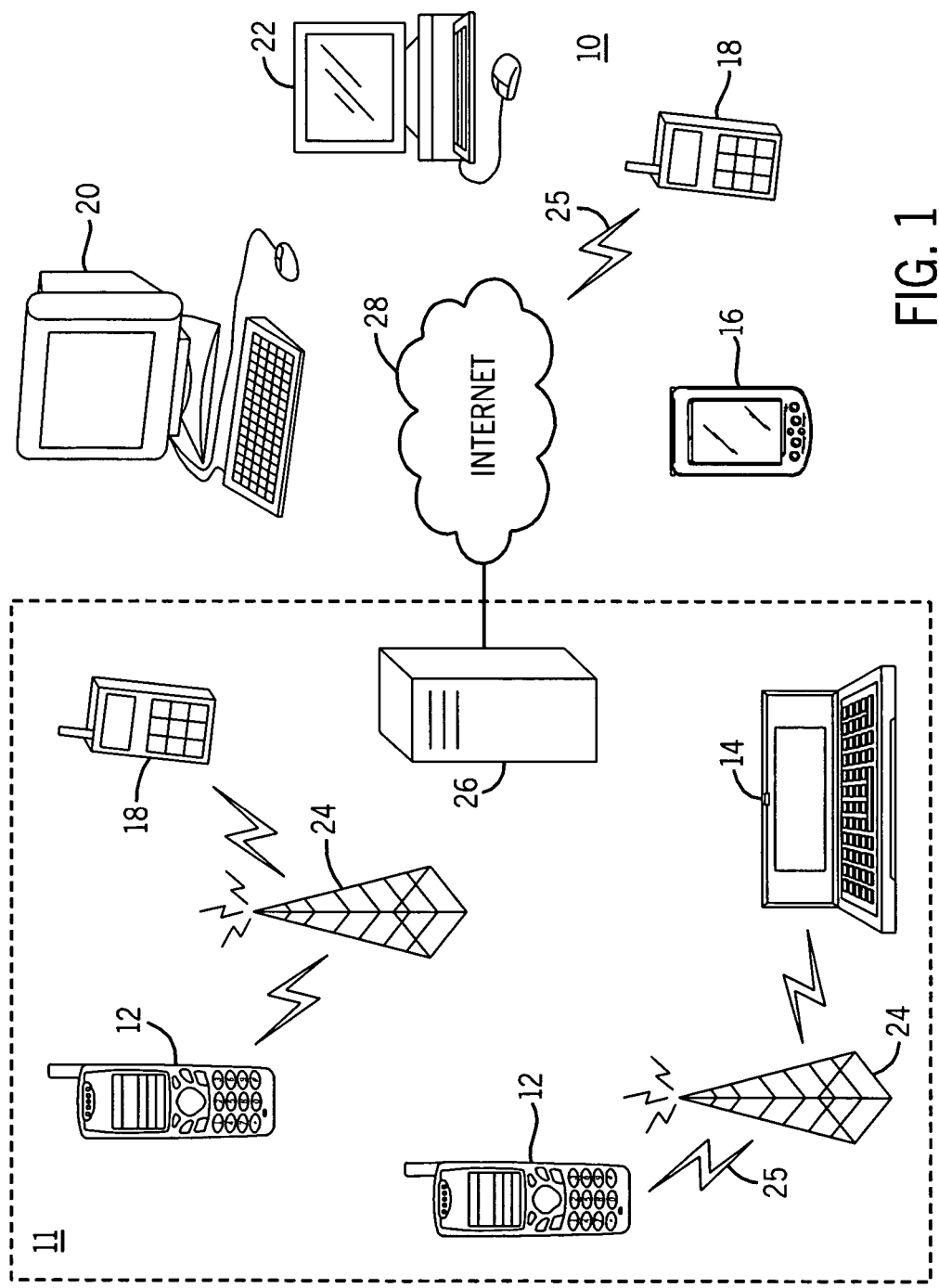
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
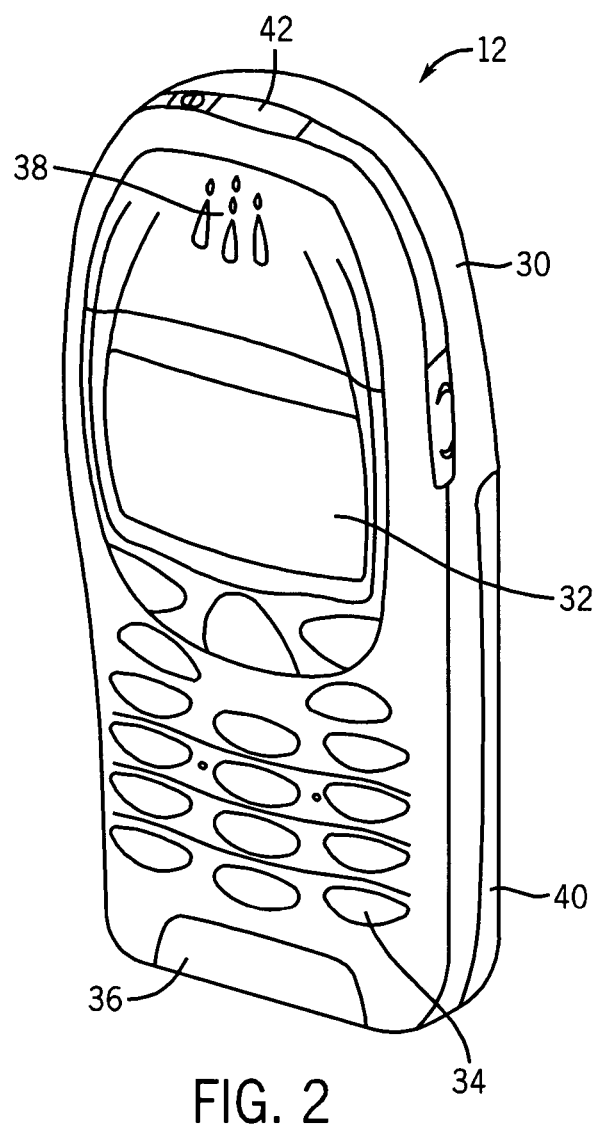
FIG. 2 is a perspective view of a mobile telephone that can be used in the implementation of the present invention.
Figure 3:
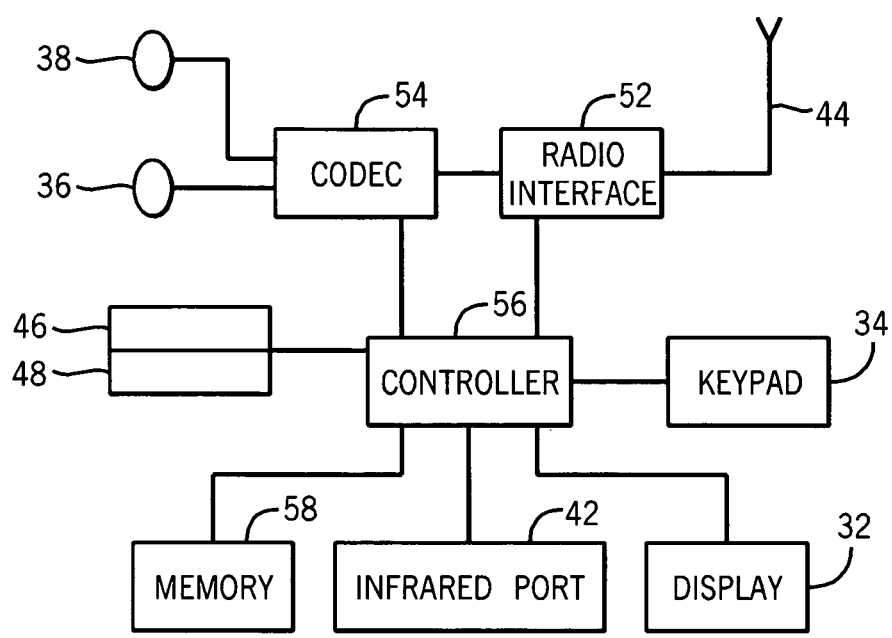
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention involves the introduction of a quarantine network in order to address threat emanating from viruses and worms. The present invention particularly focuses on limiting the damage that can result from these types of malicious programs. A quarantine network according to the present invention quarantines an infected terminal's traffic from the normal traffic flow. During the quarantining period, all of the traffic will be analyzed by the quarantine network component. Based upon the result of this analysis, the network can restrict the access of infected terminals to various services. The present invention also allows the network to lower the quality of service (QoS) for an infected terminal. The quarantine network can forward packets directly to and from the Internet 28 in a normal fashion if the packets are considered to be free of malicious objects. Furthermore, the quarantine network can notify the user of the infected terminal user by utilizing an already-established session. The quarantine network can also be additional support to the infected terminal. For example, the quarantine network can undertake various repairs if so required.

Figure 4:
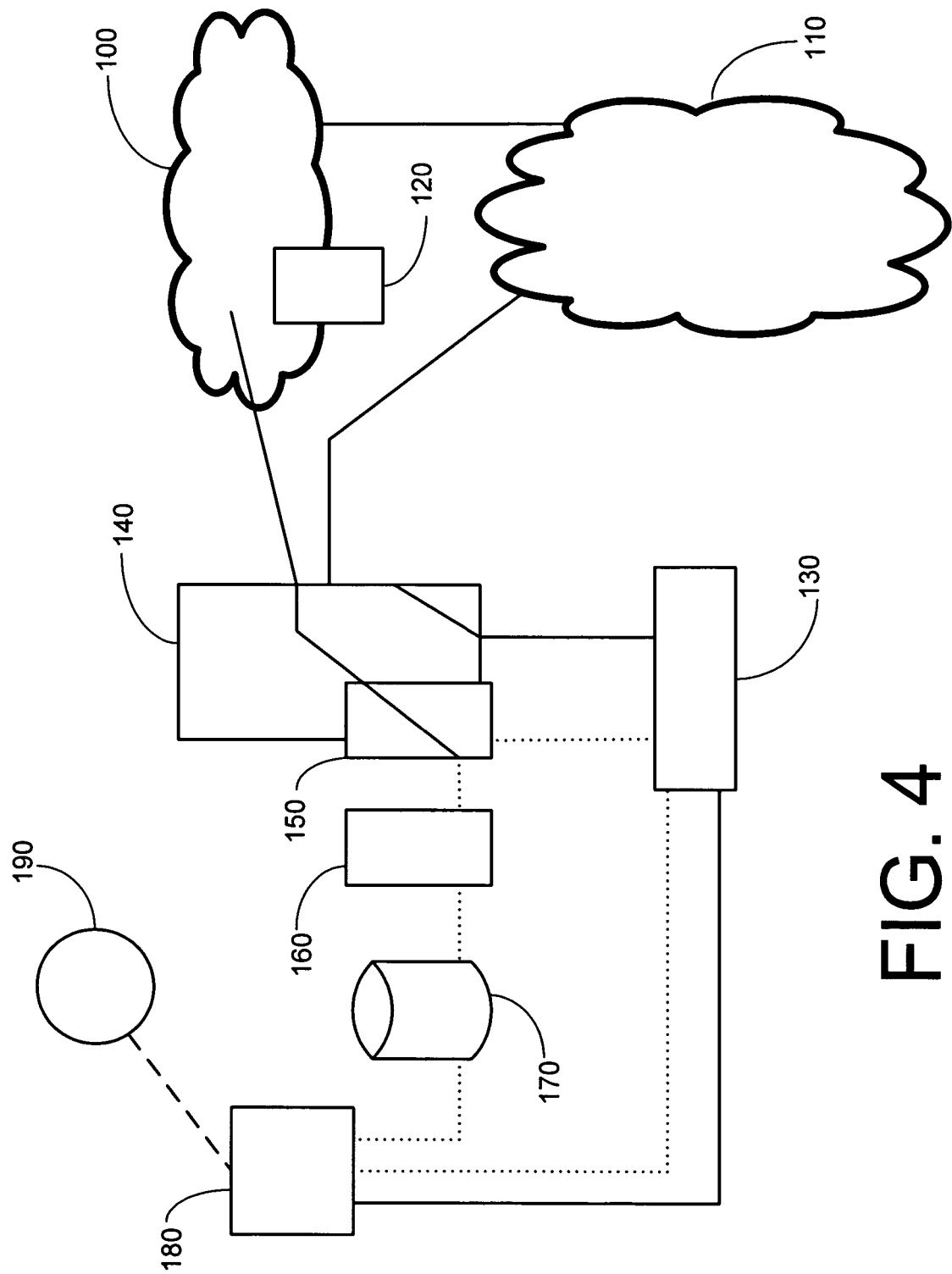
FIG. 4 is a representation of an antivirus architecture for use with one embodiment of the present invention.

FIG. 4 is a representation of the antivirus architecture according to one embodiment of the present invention. The architecture of FIG. 4 shows the interaction between a quarantine network 100 and a separate public data network (PDN) 110 or other network. The quarantine network 100 can include its own antivirus service 120 with a virus signature storage region, while an antivirus scanner 130 with an antivirus classification can be located outside of the quarantine network 100. It should be noted that the terms "antivirus scanner" and "antivirus service" can refer to devices and services which address malicious objects besides viruses, such as worms and other items. The antivirus classification for the antivirus scanner 130 is based upon a signature and a quarantine/forward decision as discussed below.

A gateway 140 or integrated services network (ISN) provides or supports a range of different telecommunications services. The gateway 140 has policy-based routing or a redirection function to steer traffic to the appropriate location or domain. An antivirus control module 150 signals the subset of viruses that must be scanned from an IP flow. The antivirus control module 150 also requests the terminal type from an IPSC 160. The IPSC 160 fetches subscriber data from a subscriber database 170 and transmits the subscriber data to the gateway 140. The subscriber database 170 stores the user's terminal type, as well as the terminal's potential subscription to the antivirus service 120. Each terminal may run its own antivirus scanner or sofftware or subscribe to the antivirus service 120 of the quarantine network 100. The terminal or user equipment is represented at 180 in FIG. 4. A remediation server 190 can provide support to terminals that are in need of repairs or updates in order to comply with particular admission requirements.

Figure 5:
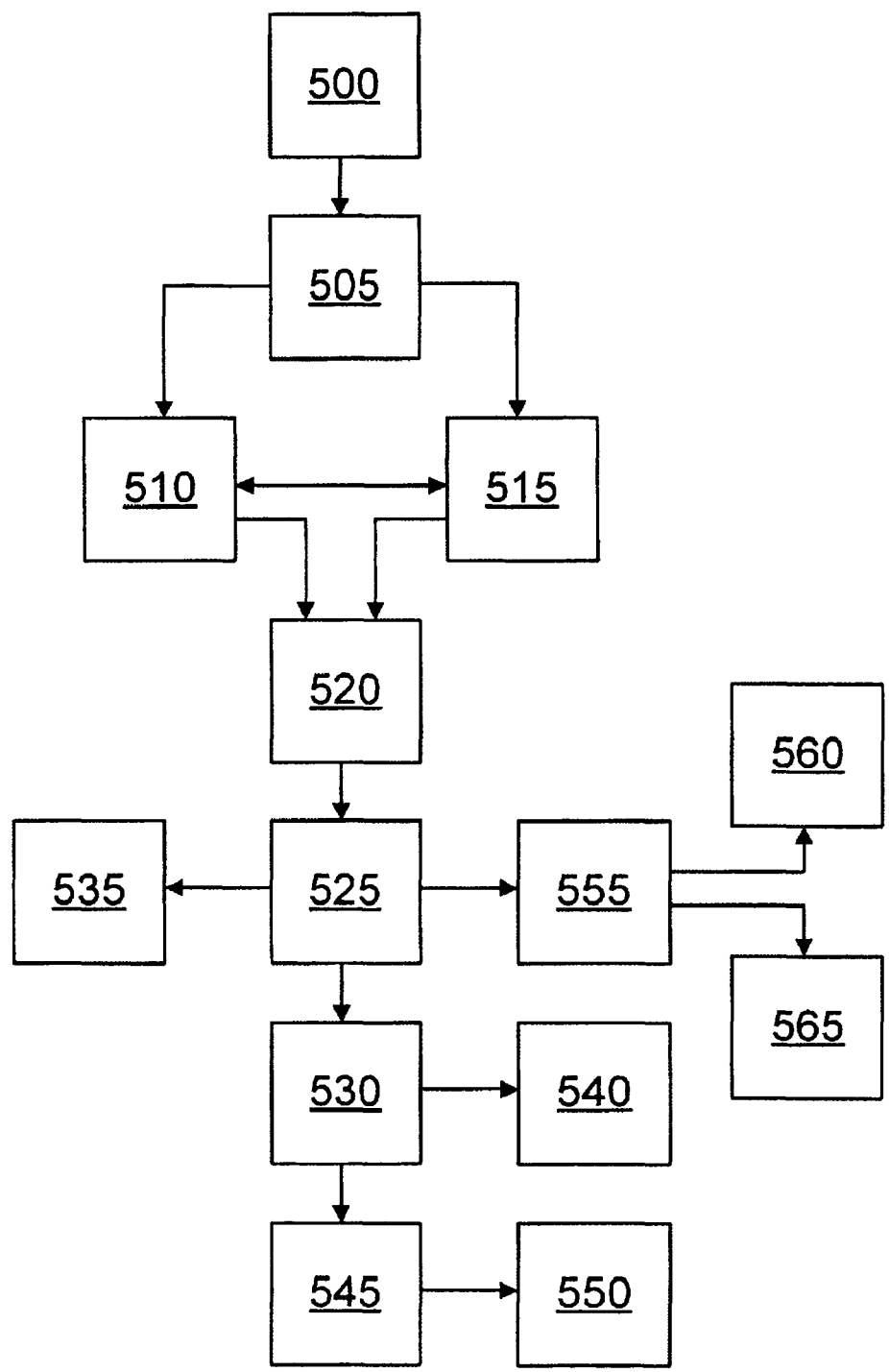
FIG. 5 is a flow chart showing the implementation of one embodiment of the present invention.

FIG. 5 shows the process for implementing one particular embodiment of the present invention. At step 500, the antivirus service 120 transmits the appropriate virus signatures to the antivirus scanner 130. The signatures are available to the antivirus scanner 130 as terminal specific subsets ((such as subset id, signature lists, etc.) The antivirus scanner 130 can also "pull" signatures from the antivirus service 120 as well, such as during a restart of the terminal, in one embodiment of the invention. At this point, the antivirus scanner 130 within the quarantine network 100 has been updated with the correct virus signatures.

At step 505, the terminal or user equipment 180 accesses the network. If the terminal 180 has its own antivirus software, then the terminal 180 should indicate the version of the software and the terminal type. This is represented at step 510. If the user has subscribed to the antivirus service 120, the terminal 180 also provides the antivirus service 120 with information about the terminal at step 515 in order to avoid scanning for all of the viruses in the world. Information such as the terminal's operating system, software packages, and other information can help to restrict the necessary scope of scanning, as the devices that may be at risk to a particular virus will vary by operating system, etc.

At step 520, the gateway 140 forwards messaging packets (for example, an HTTP message) to the antivirus scanner 130 based upon the subscriber's service set. The gateway also informs the antivirus scanner 130 of the signatures that should be checked for based upon the terminal type, version and other information that may be available concerning the terminal 180.

When a terminal 180 is suspected of being an infected terminal, the antivirus scanner 130 informs the antivirus control module 150 at step 525. The gateway 140 will then route and/or quarantine the traffic from the terminal 180 to the quarantine network 100 at step 530. The gateway can also degrade the quality of service of the infected terminal's traffic based on pre-set policies. This is represented at step 535.

If the quarantine network 100, particularly the antivirus service 120, determines that traffic from the terminal 180 poses no substantial virus or worm risk or is lower than the terminal's quality of service, then it forwards the traffic to the Internet or other public data network 110 at step 540.

The antivirus service 120 or other quarantine network component can perform a variety of actions. For example, for a downlink message from the terminal 180 to another device, the antivirus service 120 can inform the intended recipient where the message will be available at step 545. In this case, the malicious portion, such as a message attachment, is removed from the message in order to avoid spreading it to the recipient device and beyond. This is represented at step 550. The remainder of the message can be fetched from a web page in one embodiment of the invention. In the case where there is an uplink message, the antivirus service 120 analyzes and continues to forward such packets which are considered as normal.

In the event that the terminal 180 is infected, the remediation server 190 notifies the terminal 180 of the infection at step 555. The user of the terminal 180 can then download antivirus software at step 555, obtain more help from the remediation server 190 at step 560, and/or perform a variety of other tasks depending upon the particular system characteristics.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   upon an electronic device entering a network, determining that the electronic device is infected with a malicious object;
   upon determining that the electronic device is infected with the malicious object, routing, to a quarantine network, data objects emanating from the electronic device that are intended for transport to a public data network separate from the quarantine network;
   analyzing each data object routed to the quarantine network from the electronic device for inclusion of one or more virus signatures to determine whether each data object routed to the quarantine network poses a threat of including malicious material; and
   for each data object determined to not pose the threat, forwarding the data object determined to not pose the threat to the public data network.

2. The method of claim 1, further comprising in response to determining that the electronic device is infected with the malicious object, informing the electronic device of the infection.

3. The method of claim 2, further comprising providing assistance to the electronic device in order to at least partially address the infection by the malicious object.

4. The method of claim 1, further comprising in response to determining that the electronic device is infected with a malicious object, degrading a quality of service provided to traffic of the electronic device.

5. The method of claim 1, further comprising:
   receiving, from the electronic device, information usable to restrict a scan for malicious objects; and
   responsive to receiving the information, identifying, based on the information, the one or more virus signatures, which represent one or more viruses that are capable of infecting the electronic device, wherein the one or more virus signatures are a subset of pool of virus signatures available for the scan for malicious objects.

6. The method of claim 5, wherein the information is one or more of the following: information describing an operating system of the electronic device, information describing one or more software packages loaded onto the electronic device, and information concerning antivirus software previously loaded onto the electronic device.

7. The method of claim 1, further comprising:
   for each data object determined to pose the threat, determining whether the data object determined to pose the threat includes an uninfected portion;
   for each data object determined to pose the threat and include the uninfected portion, removing a malicious portion from the data object determined to pose the threat and include the uninfected portion, the removing resulting in a remaining data object portion that includes the uninfected portion; and
   for each data object determined to pose the threat and include the uninfected portion, sending instructions for accessing the remaining data object portion to an intended recipient of the data object determined to pose the threat and include the uninfected portion.

8. The method of claim 7, wherein the uninfected portion is accessible by the intended recipient through a web page.

9. The method of claim 1, further comprising:
   upon determining that the electronic device is infected with the malicious object, routing, to the quarantine network, data objects received from the public data network and intended for transport to the electronic device; and
   analyzing each data object received from the public data network and intended for transport to the electronic device, said analyzing of each data object received from the public data network and intended for transport to the electronic device including determining whether each data object received from the public data network and intended for transport to the electronic device poses the threat of including malicious material.

10. The method of claim 9, wherein the data objects emanating from the electronic device that are intended for transport to the public data network are uninspected for malicious material prior to routing to the quarantine network.

11. One or more non-transitory computer readable media storing computer-executable instructions configured to, when executed, cause one or more computing devices to at least:
   upon an electronic device entering a network, determine that the electronic device is infected with a malicious object;
   upon determining that the electronic device is infected with the malicious object, route, to a quarantine network, data objects emanating from the electronic device that are intended for transport to a public data network separate from the quarantine network;

analyzing each data object routed to the quarantine network from the electronic device for inclusion of one or more virus signatures to determine whether each data object routed to the quarantine network poses a threat of including malicious material; and for each data object determined to not pose the threat, forwarding the data object determined to not pose the threat to the public data network.

12. The one or more non-transitory computer readable media of claim 11, further storing computer-executable instructions configured to, when executed, cause the one or more computing devices to:

in response to determining that the electronic device is infected with the malicious object, inform the electronic device of the infection.

13. The one or more non-transitory computer readable media of claim 12, further storing computer-executable instructions configured to, when executed, cause the one or more computing devices to:

provide assistance to the electronic device in order to at least partially address the infection by the malicious object.

14. The one or more non-transitory computer readable media of claim 11, further storing computer-executable instructions configured to, when executed, cause the one or more computing devices to:

receive, from the electronic device, information usable to restrict a scan for malicious objects responsive to receiving the information, identify, based on the information, the one or more virus signatures, which represent one or more viruses that are capable of infecting the electronic device, wherein the one or more virus signatures are a subset of a pool of virus signatures available for the scan for malicious objects.

15. The one or more non-transitory computer readable media of claim 11, further storing computer-executable instructions configured to, when executed, cause the one or more computing devices to:

for each data object determined to pose the threat, determine whether the data object determined to pose the threat includes an uninfected portion;

for each data object determined to pose the threat and include the uninfected portion, remove a malicious portion from the data object determined to pose the threat and include the uninfected portion, the removing resulting in a remaining data object portion that includes the uninfected portion; and for each data object determined to pose the threat and include the uninfected portion, send instructions for accessing the remaining data object portion to an intended recipient of the data object determined to pose the threat and include the uninfected portion.

16. A computing system, comprising:

an electronic device comprising a first processor, and a first memory storing computer-executable instructions configured to, with the first processor, cause the electronic device to at least upon a terminal entering a network, determine that the terminal is infected with a malicious object, and upon determining that the terminal is infected with the malicious object, route, to a quarantine network, data objects emanating from the terminal that are intended for transport to a public data network that is separate from the quarantine network; and a computing device comprising a second processor and a second memory storing computer-executable instructions configured to, with the second processor, cause the computing device to at least analyze each data object routed to the quarantine network from the electronic device for inclusion of one or more virus signatures to determine whether each data object routed to the quarantine network poses a threat of including malicious material, and for each data object determined to not pose the threat, forwarding the data object determined to not pose the threat to the public data network.

17. The computing system of claim 16, wherein the second memory further stores computer-executable instructions configured to, with the second processor, cause the computing device to:

in response to determining that the terminal is infected with the malicious object, inform the terminal of the infection.

18. The computing system of claim 17, wherein the second memory further stores computer-executable instructions configured to, with the second processor, cause the computing device to:

provide assistance to the terminal in order to at least partially address the infection by the malicious object.

19. The computing system of claim 16, wherein the second memory further stores computer-executable instructions configured to, with the second processor, cause the computing device to:

receive, from the terminal, information usable to restrict a scan for malicious objects; and responsive to receiving the information, identify, based on the information, the one or more virus signatures, which represent one or more viruses that are capable of infecting the terminal, wherein the one or more virus signatures are a subset of a pool of virus signatures available for the scan for malicious objects.

20. The computing system of claim 16, wherein the second memory further stores computer-executable instructions configured to, with the second processor, cause the computing device to:

for each data object determined to pose the threat, determine whether the data object determined to pose the threat includes an uninfected portion;

for each data object determined to pose the threat and include the uninfected portion, remove a malicious portion from the data object determined to pose the threat and include the uninfected portion, the removing resulting in a remaining data object portion that includes the uninfected portion; and for each data object determined to pose the threat and include the uninfected portion, transmit instructions for accessing the remaining data object portion to an intended recipient of the data object determined to pose the threat and include the uninfected portion.

21. A system, comprising:

a quarantine network; and a gateway device in at least selective communication with the quarantine network; and wherein the gateway device includes a memory storing computer-executable instructions configured to, when executed, cause the gateway device to:

upon a terminal entering a network, determine whether the terminal is infected with a malicious object; and upon determining that the terminal is infected with the malicious object, route, to the quarantine network, data objects emanating from the terminal that are intended for transport to a public data network separate from the quarantine network;

wherein the quarantine network includes a quarantine network component configured to:
- analyze each data object routed to the quarantine network from the terminal for inclusion of one or more virus signatures to determine whether each data object routed to the quarantine network poses a threat of including malicious material;
- for each data object determined to not pose the threat, forward the data object determined to not pose a threat to the public data network; and
- for each data object determined to pose the threat, prevent at least a portion of the data object determined to pose the threat from being forwarded to the public data network.

22. The system of claim 21, wherein the quarantine network component is further configured to:
- for each data object determined to pose the threat, determine whether the data object determined to pose the threat includes an uninfected portion;
- for each data object determined to pose the threat and include the uninfected portion, remove a malicious portion from the data object determined to pose the threat and include the uninfected portion, the removing resulting in a remaining data object portion that includes the uninfected portion; and
- for each data object determined to pose the threat and include the uninfected portion, transmit instructions for accessing the remaining data object portion to an intended recipient of the data object determined to pose the threat and include the uninfected portion.

* * * * *